US006791800B2

(12) United States Patent
Takeo et al.

(10) Patent No.: US 6,791,800 B2
(45) Date of Patent: Sep. 14, 2004

(54) DEVICE FOR SUPPRESSING MAGNETIC NOISE OF DUAL-LAYERED DISK IN A DISK DRIVE

(75) Inventors: Akihiko Takeo, Kunitachi (JP); Yoichiro Tanaka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 09/943,087

(22) Filed: Aug. 31, 2001

(65) Prior Publication Data

US 2002/0034052 A1 Mar. 21, 2002

(30) Foreign Application Priority Data

Sep. 21, 2000  (JP) ........................................ 2000-287389

(51) Int. Cl.[7] .............................................. G11B 5/00
(52) U.S. Cl. .................................................. 360/264.7
(58) Field of Search .......................... 360/264.7, 97.01, 360/97.02, 75; 428/694 TM

(56) References Cited

U.S. PATENT DOCUMENTS 5,654,847 A * 8/1997 Yagi et al. ............... 360/97.02
5,815,342 A * 9/1998 Akiyama et al. ......... 360/97.01
6,490,117 B1 * 12/2002 Sacks et al. ................... 360/75
6,548,194 B2 * 4/2003 Hikosaka et al. ..... 428/694 TM

FOREIGN PATENT DOCUMENTS

| EP | 0 359 879 | | 3/1990 |
| JP | 03012004 A | * | 1/1991 |
| JP | 6-76202 | | 3/1994 |
| JP | 6-236674 | | 8/1994 |
| JP | 2947029 | | 7/1999 |
| JP | 2000-067416 | | 3/2000 |

* cited by examiner

Primary Examiner—Tianjie Chen
(74) Attorney, Agent, or Firm—Pillsbury Winthrop LLP

(57) ABSTRACT

There is disclosed a disk drive having a magnetic device for applying a direct current magnetic field to the disk 1 by using a disk with a double-layered structure in which a soft magnetic layer is provided on a lower layer of the recording magnetic layer. The magnetic device generates a direct current magnetic field to uniform a magnetic domain state of the soft magnetic layer of the disk. The intensity of the direct current is larger than the anisotropic magnetic field of the soft magnetic layer and is smaller than the coercive force of the recording magnetic layer. As a consequence, the stabilization of the magnetic domain state of the soft magnetic layer of the disk can be realized to make an attempt of decreasing the magnetic noise and establishing stabilization with respect to the disturbance magnetic field.

3 Claims, 4 Drawing Sheets

DEVICE FOR SUPPRESSING MAGNETIC NOISE OF DUAL-LAYERED DISK IN A DISK DRIVE

CROSS-REFERENCE TO RELATED APPLICATIONS

This application is based upon and claims the benefit of priority from the prior Japanese Patent Application No. 2000-287389, filed Sep. 21, 2000, the entire contents of which are incorporated herein by reference.

BACKGROUND OF THE INVENTION

1. Field of the Invention

The present invention generally relates to a perpendicular magnetic recording method disk drive, and in particular a disk drive provided with a function of realizing the stabilization of a soft magnetic layer of a disk medium.

2. Description of the Related Art

In recent years, in the field of a disk drive represented by a hard disk drive, as a technology for exceeding a limit of a recording density in the longitudinal magnetic recording method, a perpendicular magnetic recording method is noted. In this perpendicular magnetic recording method, the realization of a disk drive using a disk medium (hereinafter, simply referred to as a disk) which has a double-layered structure as a recording medium is promoted.

A disk having the double-layered structure has a magnetic recording layer showing a magnetic anisotropy in a perpendicular direction, and a soft magnetic layer between the recording magnetic layer and a substrate. The soft magnetic layer has a function of allowing some of the magnetic flux generated from one of the magnetic poles of the head to pass to the other magnetic pole at the time of a data recording operation, supporting a recording operation of the head.

By the way, it has been confirmed that magnetic noise is likely to be generated in the soft magnetic layer from instability in the magnetic domain state. In particular, when the head moves on the disk, a spike (or a pulse) magnetic noise is likely to be generated from the soft magnetic layer which comes close to the head. This magnetic noise affects the recording magnetic layer so that the reproduction signal level from the head is lowered. Furthermore, the soft magnetic layer has a high sensitivity against a disturbance magnetic field, which constitutes a factor of generating a destabilization of the magnetic state of the recording magnetic layer.

In order to make an attempt of realizing a disk drive of a perpendicular magnetic recording method using a double-layered structure disk, it is indispensable to take measures of suppressing the generation of magnetic noises from the soft magnetic layer while suppressing instability of the magnetic domain state in the above soft magnetic layer.

There is proposed a constitution of a casing of a disk drive of ferromagnetic substance material, in particular, for the realization of a shield function with respect to a disturbance magnetic field. (See, for example, U.S. Pat. No. 5,654,847). However, in this proposed method, the instability of the soft magnetic layer with respect to the disturbance magnetic field can be suppressed, but the shield function is weak against the magnetic field (floating magnetic field) generated from the inside of the disk drive, and the instability of the magnetic domain state of the soft magnetic layer cannot be settled.

Furthermore, as another proposal, there is proposed a disk structure in which a hard magnetic pinning layer is provided which has uniform magnetization which is exchange connected to the soft magnetic layer on the lower layer of the soft magnetic layer. (For example, see Japanese Patent Publication No. 2,947,029.) In such a disk structure, there is a possibility that endurance against a disturbance magnetic field can be improved, and the stabilization of the magnetic domain state of the soft magnetic layer can be stabilized. However, the uniforming step of magnetization with respect to the hard magnetic pinning layer becomes necessary. Furthermore, the thickness of the structure layer of the disk becomes extremely thick. This makes it particularly hard to manufacture.

Furthermore, there is proposed a disk drive which uses a magnetic head having a magnetic field generation device for applying a magnetic field to the soft magnetic layer. (For example, see U.S. Pat. No. 5,815,342) However, there is a fatal defect such that the magnetic field from the magnetic field generation device affects the magnetic head as a disturbance magnetic field with the result that the realization is difficult as a result.

BRIEF SUMMARY OF THE INVENTION

An object of the present invention is to realize the stabilization of the magnetic domain state of the soft magnetic layer of the disk without affecting the special manufacture step and the magnetic head thereby attempting to decrease the magnetic noise and to realize stabilization with respect to the disturbance magnetic field.

The present invention provides a disk drive having a device which uses a double-layered structure provided with a soft magnetic layer on the lower layer of the magnetic recording layer, so that the magnetic domain of the soft magnetic layer is uniformed, the device generating a magnetic field for stabilizing the structure of the magnetic domain. That is, the disk drive comprises: a disk medium which is a double-layered data recording medium having a magnetic recording layer and a soft magnetic layer; a head for conducting a read/write operation of data with respect to the magnetic recording layer of the disk medium; an actuator for moving the head in a radial direction on the disk medium; and a device for applying a direct current magnetic field having an intensity of a predetermined magnetic field to the longitudinal direction corresponding to a horizontal direction in the case where the axial direction of the disk medium is set as a vertical direction.

In such a structure, the magnetic domain of the soft magnetic layer of the disk is uniformed without affecting the magnetic head and without requiring a special manufacture step, with the result that the stabilization of the structure of the magnetic domain can be realized. Consequently, with a method which allows the realization, the magnetic disk is decreased from the soft magnetic layer and the stability of the disturbance magnetic field can be secured. As a consequence, it becomes possible to promote the realization of the disk drive of the perpendicular magnetic recording method using, for example, the two-layer structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

Figure 1:
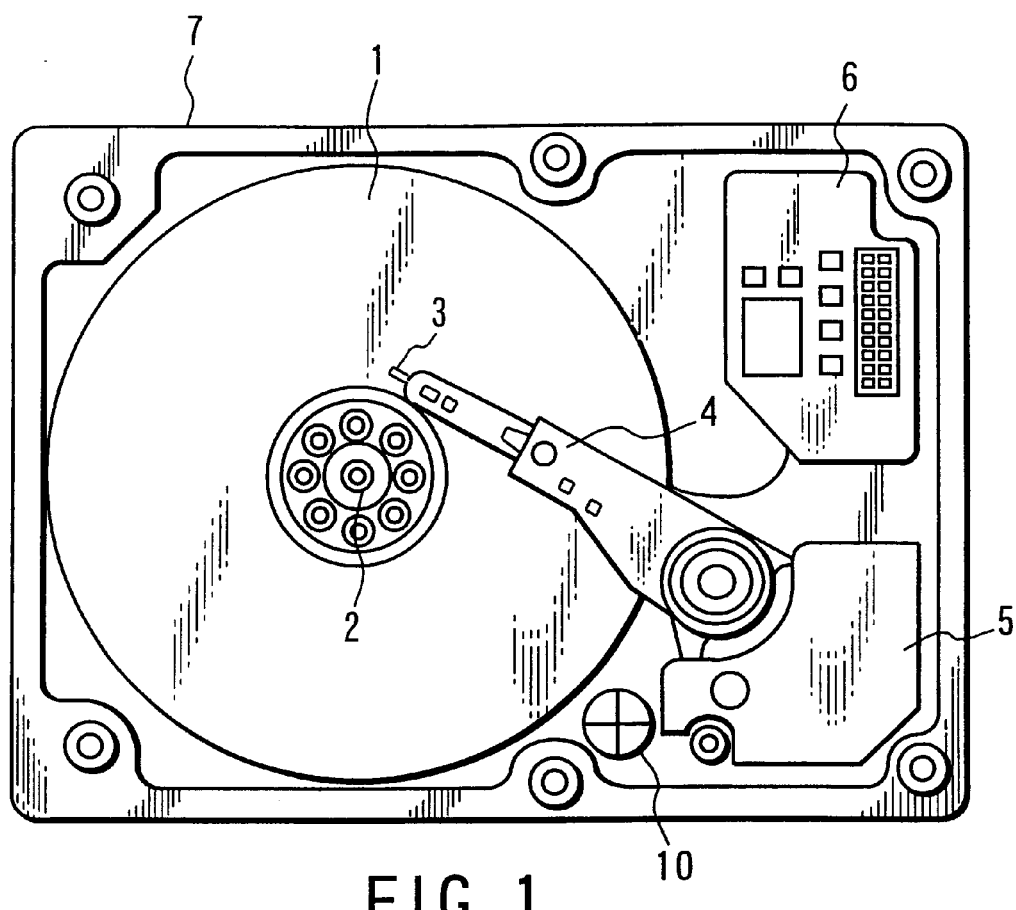
FIG. 1 is a view showing an essential portion of a disk drive according to a first embodiment of the present invention.
Figure 2:
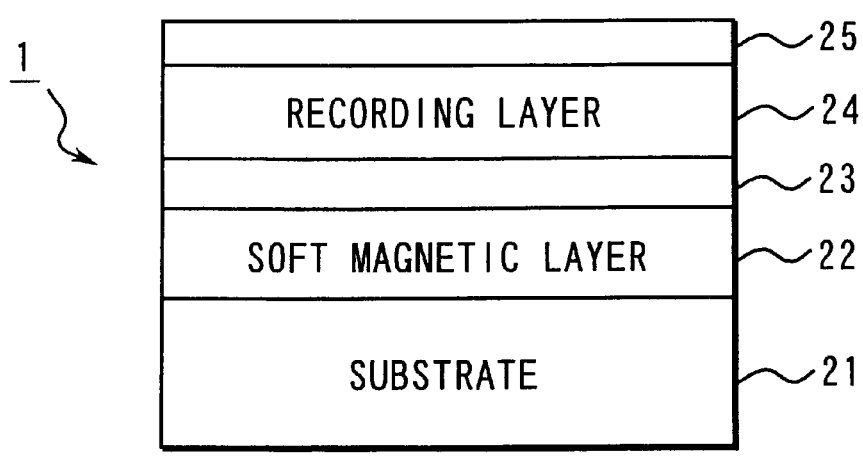
FIG. 2 is a view for explaining a disk structure according to the embodiment.

Hereinafter, embodiments of the present invention will be explained hereinbelow by referring to the drawings.
(Disk Drive Mechanism)

FIG. 1 is a view showing an essential portion of a perpendicular magnetic recording method disk drive according to a first embodiment of the present invention. The disk drive has a structure such that a drive mechanism is incorporated which comprises a disk 1, a spindle motor (SPM) 2, and an actuator inside a casing (an upper cover thereof is omitted) which is a drive main body.

The actuator comprises an arm 4 including a suspension mounting a head 3, and a voice coil motor (VCM) 5 for moving the arm 4 on the disk 1 in a radial direction. The actuator moves the head 3 on a disk in a radial direction during read/write operation of data. Furthermore, at the time of the suspension of the data read/write operation, an unload operation is conducted for allowing the head 3 to be retreated from the disk 1 to the lamp member (not shown) arranged outside of the disk 1.

Furthermore, on the casing 7, a circuit substrate 6 packaging a preamplifier circuit is arranged. The preamplifier circuit is connected to the head 3 via the FPC (flexible print cable) to transmit the read/write signal.

The disk 1 has a double-layered structure having a magnetic recording layer 24 having a magnetic anisotropy in a perpendicular direction, and a soft magnetic layer 22 intervening between the magnetic recording layer 24 and the substrate 21.

Furthermore, inside of the casing 7, a magnetic device 10 of a direct current dielectric magnetic field is provided. As described below, in the magnetic device 10, a direct current magnetic field is applied in the longitudinal direction of the disk 1 to uniform the magnetic domain of the soft magnetic layer 22. The magnetic device 10 is located at a position separated from the head 3 in the vicinity of the actuator. Furthermore, the magnetic device 10 is located at a position where the magnetic field acts on the range of the disk 1 corresponding to the range in which the head 3 further moves.
(Disk Structure)

When a structure of the disk 1 is specifically explained, for example, a Co—Zr—Nb type soft magnetic layer 22 is laminated to a thickness of about 300 nm on the surface of the aluminum or glass material substrate 21. Furthermore, on the soft magnetic layer 22, the magnetic recording layer 24 comprising a Co—Cr—Pt type alloy and a surface protection film 25 made of a carbon material are laminated by a sputtering processing. Incidentally, the soft magnetic layer 22 may be made of magnetic material such as sendust, a Ni—Fe type alloy, a Fe—Co type alloy or the like.
(Characteristic of Soft Magnetic Layer)

The state of the magnetic domain of the soft layer 22 can be observed with the Kerr effect measuring method using an optical surface analyzer. When a special magnetic domain control is not conducted, a large number of magnetic walls (boundary locations of the magnetic domain) are present on the soft magnetic layer 22. Many magnetic walls are located, in particular, in the vicinity of the side of the outer periphery of the disk with the static magnetic energy state.

After the disk 1 having such a soft magnetic layer is demagnetized with a direct current, the read operation is conducted with respect to the disk 1 by the magnetic head 3 and the reproduction waveform from the head 3 is observed. From this observation, the phenomenon can be confirmed in which a large number of noises with a spike-like configuration (pulse-like configuration) can be generated from the disk 1 on which data is not recorded. The location of such spike-like noises approximately corresponds to the position of the magnetic wall of the soft magnetic layer 22. Consequently, it is assumed that the magnetic wall of the soft magnetic layer 22 constitutes a factor in the generation of spike noise. The magnetic wall of the soft magnetic layer 22 is affected and changed even with a small disturbance magnetic field.

Next, by a measuring method using an optical surface analyzer, the state of the magnetic domain (magnetized state) of the soft magnetic layer 22 can be observed in the case where the magnetic field is given, for example, with the permanent magnet with respect to the disk 1. From this observation, it can be confirmed that the state of the magnetic domain is uniformed with the applied magnetic field from the permanent magnet. Here, the area to which the magnetic field is applied with the permanent magnet is a restricted area. However, it is confirmed that a part of the magnet flux is saturated with the permanent magnet so that the magnet flux is transmitted to the inside of the soft magnetic layer 22 and the magnetic domain state of the soft magnetic layer 22 is widely uniformed.
(Operation and Effect of the First Embodiment)

Hereinafter, there will be explained an operation and an effect of a magnetic device 10 provided on the disk drive according to the first embodiment.

According to the first embodiment, as shown in FIG. 1, a direct current magnetic field is always applied in a longitudinal direction (radial direction) of the disk 1 with the magnetic disk 10 provided in the vicinity of the actuator. Incidentally, as the magnetic device 10, an electromagnet having a coil wound around an iron core is assumed. However, as the magnetic device 10 mounted on the disk drive, a permanent magnet which does not require a power source is desirable.

With respect to the electromagnet, it is possible to adjust the intensity (H=A/m) of the direct current magnet which is applied to the disk 1. Here, even when the direct current magnetic field having, for example, a magnetic intensity of 10×79.58 A/m or less is applied to the disk 1 from the electromagnet, the frequency of the generation of spike noises in accordance with the magnetic domain state of the soft magnetic layer 22 does not change. Consequently, no conspicuous effect against the noise decrease can be obtained.

On the other hand, when the direct current magnetic field having a magnetic field intensity (H) of 50×79.58 A/m or more is applied, spike noises in accordance with the state of the magnetic domain state of the soft magnetic layer 22 cease to be generated, thereby providing a conspicuous effect upon noise reduction.

In summary, it can be assumed that the magnetization of the soft magnetic layer 22 is saturated and the state of the magnetic domain can be uniformed by the generation of the applied magnetic field having an intensity of the magnetic field larger than the magnetic field having a magnetic anisotropy of the soft magnetic layer 22.

Furthermore, it has been confirmed that, for example, the application of the direct current magnetic field having, for example, a magnetic field intensity (H) of 1500×79.58 A/m or more decreases the amplitude value of the reproduction signal from the head 3 more than the regulated value. In summary, when the applied magnetic field from the magnetic device 10 is too strong, both the head 3 and the recording magnetic layer 24 are affected. In particular, it can be assumed that when a magnetic field is applied which is larger than the coercive force of the recording magnetic layer 24, the magnetization of the recording magnetic layer 24 is attenuated.

Figure 3:
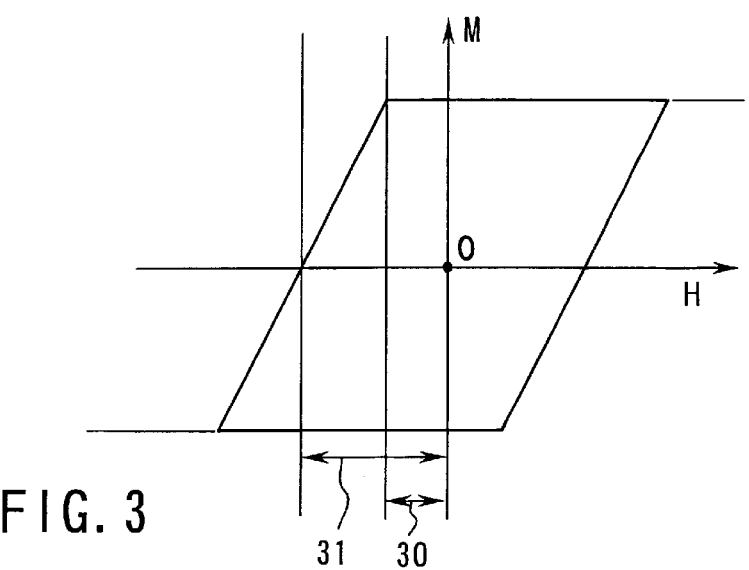
FIG. 3 is a view for explaining a magnetic characteristic of a magnetic recording layer according to the embodiment.

Consequently, it is required to set the intensity (H) of the magnetic field applied to the disk 1 from the magnetic device 10 to be larger than the magnetic field in the magnetic anisotropy of the soft magnetic layer and, at the same time, smaller than the coercive force 31 (FIG. 3) of the recording magnetic layer 24. Here, in the case of the double-layered disk having a square-shaped hysteresis as the disk 1, it is desirable that the intensity (H) of the applied magnetic field from the magnetic device 10 is smaller than the intensity 30 (FIG. 3) of the magnetic field at the irreversible magnetization reverse start of the recording magnetic layer 24 of the disk.

Next, the arrangement relationship of the magnetic device 10 will be explained.

As an arrangement of the magnetic device 10, as shown in FIG. 1, the vicinity of the VCM is structurally desirable. However, cases as shown in FIGS. 4A and 4B are acceptable.

Figure 4A:
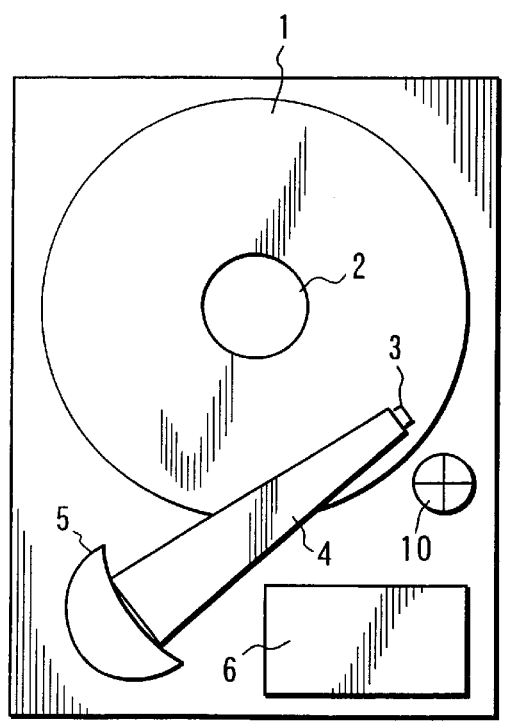
FIGS. 4A through 4B are views for explaining an arrangement relationship of a magnetic device according to the embodiment.

In the beginning, the arrangement shown in FIG. 4A is an arrangement which enables to uniform the magnetic domain state of the soft magnetic layer corresponding to the range (range of a seeking operation) in which the head 3 moves with the applied magnetic field. Incidentally, the range in which the head 3 moves refers to the data recording effective range in the recording magnetic layer 2 on the disk 1.

However, in this arrangement structure, it has been confirmed that the amplitude of the reproduction signal from the head 3 is too strong with the attenuation with the regulated value even when the intensity of the applied magnetic field from the magnetic device 10 is on the order of 50×79.58 A/m. That is, it can be assumed that in the arrangement of the magnetic device as shown in FIG. 4A, the position of the magnetic device 10 comes too close to the head, so that the applied magnetic field largely affects the head 3. As a consequence, it can be assumed that a strong head magnetic field is generated with the mutual action of the head 3 and the soft magnetic layer 22 so that the magnetization of the magnetic recording layer 24 can be attenuated. Consequently, as shown in FIG. 1, it is desirable that the position of the magnetic device 10 is separated so that the applied magnetic field does not affect the head 3 so much.

Figure 4B:
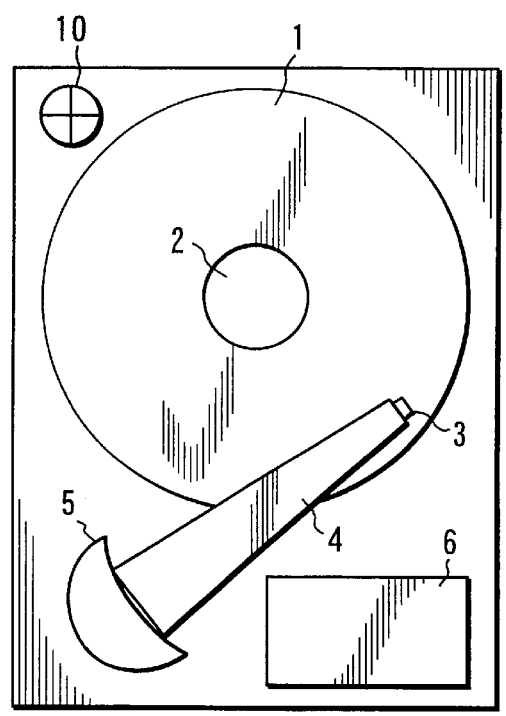

Next, the arrangement of the magnetic device 10 as shown in FIG. 4B will be investigated.

In this arrangement structure, the position of the magnetic device 10 is set on the opposite side of the movement range of the head 3 on the disk 1 so that the spindle motor 2 is located in the midst thereof. At this position, it is possible to suppress the influence of the applied magnetic field from the magnetic device 10 to the head 3.

However, in this arrangement structure, it has been confirmed that a spike noise is generated in the reproduction output from the head 3 even in the case where the intensity of the applied magnetic field from the magnetic device 10 is set to about 1000×79.58 A/m. In summary, it can be assumed that the applied magnetic field from the magnetic device 10 does not effectively act on the soft magnetic layer 22 of the disk 1. That is, it has been confirmed that the control of the magnetic domain (uniforming of the magnetic domain state) by the applied magnetic field from the magnetic device 10 is effective only in the range approximate to the applied position of the magnetic field.

For the above reasons, as shown in FIG. 1, the arrangement structure of the magnetic device 10 according to the first embodiment is effective for the control of the magnetic domain of the soft magnetic layer 22. Furthermore, in this arrangement structure, the applied magnetic field is separated at a position where the magnetic field does not affect the head 3 so much. In other words, an arrangement structure is desirable in which a straight line connecting the position of the magnetic device 10 and the position of the head 3 (movement position) does not intersect the center of rotation of the disk 1 (rotation shaft of the spindle motor 2).

Incidentally, it is required to adjust the arrangement of the magnetic device 10 so that the intensity (H) of the applied magnetic field which directly acts upon the head 3 is set to 5×79.58 A/m or less. As a consequence, it is possible to prevent a phenomenon in which the head 3 is erroneously operated.

As described above, according to the embodiment, the control of the magnetic domain can be realized so that the magnetic domain state of the soft magnetic layer 22 is uniformed with respect to the double-layered structure disk 1 by providing the magnetic device 10 such as a permanent magnet or the like at a predetermined position inside the disk drive. In this case, the phenomenon can be prevented in which the applied magnetic field from the magnetic field 10 affects the magnetic head 3 outside the tolerance range. In summary, in the method according to the embodiment, the stabilization of the magnetic domain state of the soft magnetic layer 22 of the disk can be realized without special manufacturing steps. Consequently, with the realizable method, the noise from the soft magnetic layer 22 can be decreased and the stability by the disturbance magnetic field can be secured.

Incidentally, there has been explained a case of one magnetic device 10 in this embodiment. Naturally, a plurality of magnetic devices 10 may be arranged.

(Second Embodiment)

Figure 5:
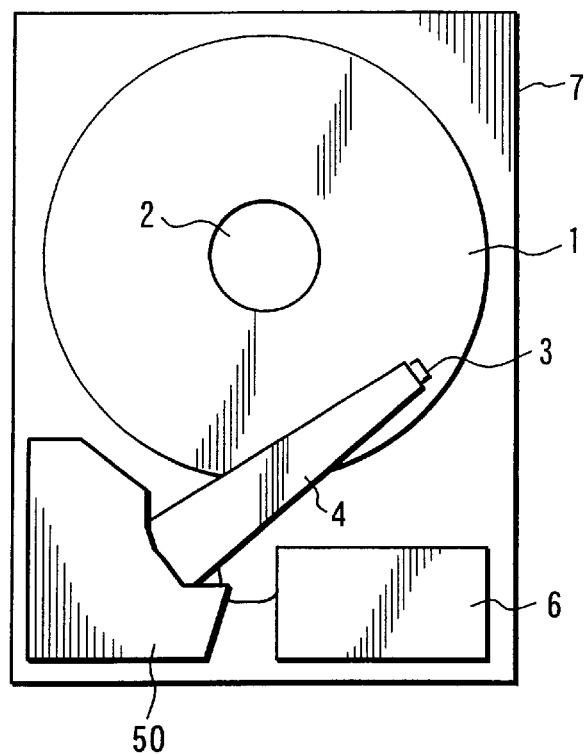
FIG. 5 is a view showing an essential portion of a disk drive according to a second embodiment of the present invention.
Figure 6:
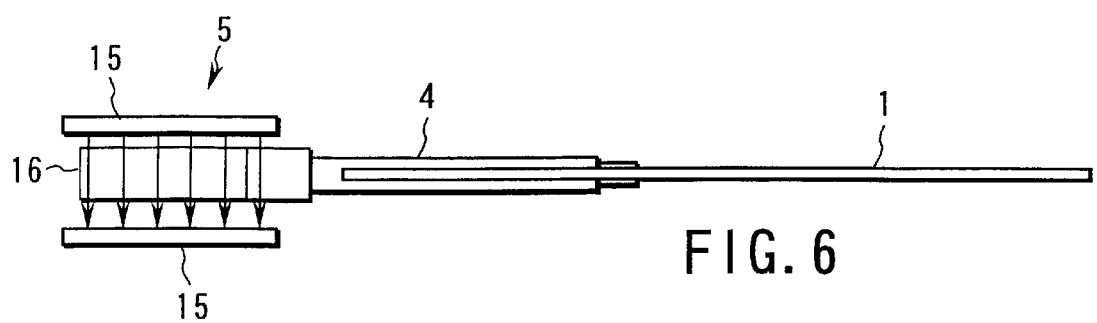
FIG. 6 is a view for explaining a magnetization action of a magnet member of a VCM according to the second embodiment.
Figure 7:
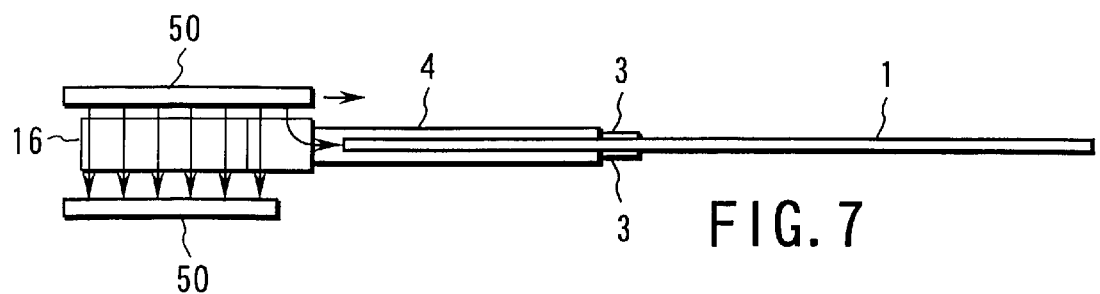
FIG. 7 is a view for explaining a magnetization action of a magnetic device according to the second embodiment.

FIGS. 5 to 7 are views showing a second embodiment.

The second embodiment has a structure which serves also as a magnet member (permanent magnet) which constitutes a magnetic circuit of a VCM 5 as the magnetic device 10

(reference numeral 50 of FIG. 5). In such a structure, it is not required to prepare a magnetic device 10 as an independent component. In the case where the VCM5 is designed in advance, the specification of the magnet member 50 (magnetic characteristic, size or the like) may be set so that the function of the magnetic device 10 (application of effective magnetic field to the soft magnetic layer 22) can be obtained.

FIG. 6 is a conceptual view showing a structure of the conventional VCM 5. The VCM 5 drives the arm 4 with a mutual action with the magnet member 15 and the electromagnetic coil 16. Conventionally, the design of the VCM5 is conducted so that the magnetic flux (shown by an arrow) from the magnet member 15 does not act on the side of the disk 1.

In this variation, as shown in FIG. 7, the VCM 5 is designed so that a predetermined magnetic field is applied to the side of the disk 1 from the magnetic field which also serves as the magnet member 50. That is, the VCM5 can be designed in a specification such that a leak magnetic flux in the order effective for uniformity (uniform saturation of the magnetization) of the magnetic domain state of the soft magnetic layer 22 without exceeding the coercive force of the magnetic recording layer 24 of the disk 1 is provided from the magnetic member 50.

In the structure of the second embodiment, since the magnetic device 10 can be eliminated as an independent component, the same operation and effect as those in the first embodiment can be obtained at a relatively low cost.

(Third Embodiment)

Figure 8:
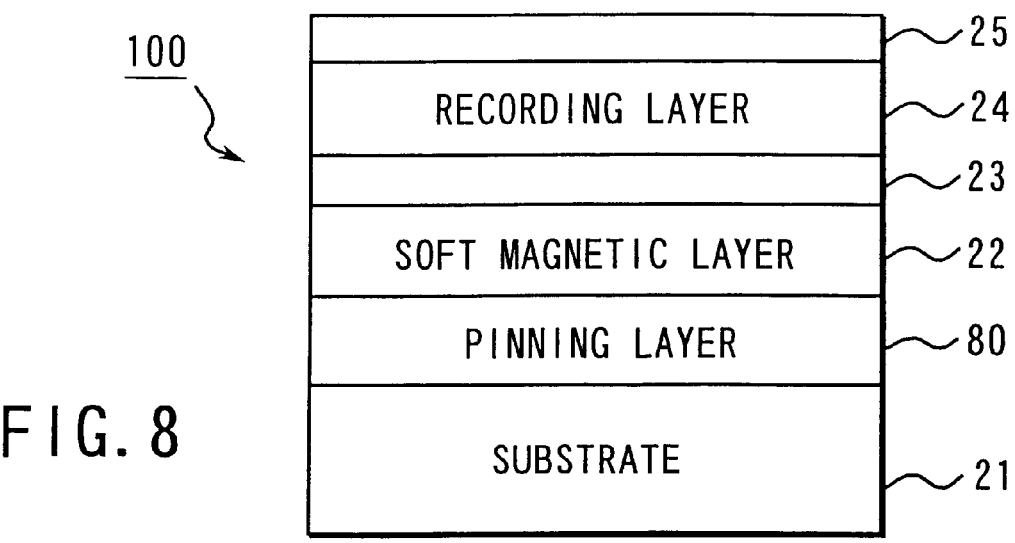
FIG. 8 is a view for explaining a disk structure according to a third embodiment of the present invention.
Figure 9:
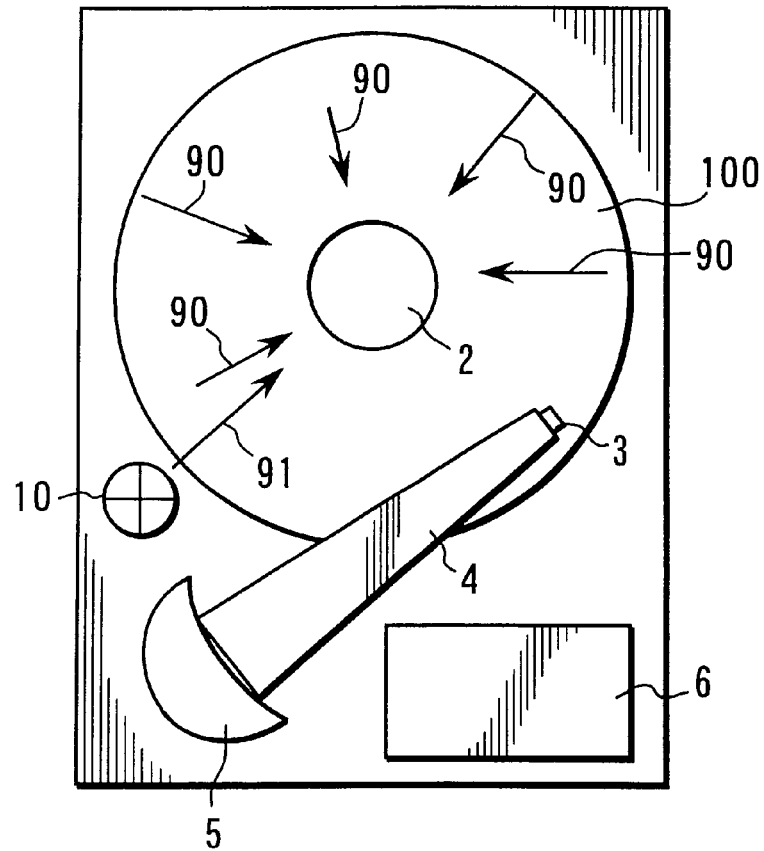
FIG. 9 is a view showing an essential portion of the disk drive according to the third embodiment.

FIGS. 8 and 9 are views showing a third embodiment.

The third embodiment relates to a disk drive which uses three-layered structure disk 100 provided with a magnetic pinning layer 80 between the soft magnetic layer 22 and the substrate 21 as shown in FIG. 8.

Even in the case of the disk 100 having such a three-layered structure, as shown in FIG. 9, the stability of the magnetic domain state of the soft magnetic layer of the disk 1 can be realized by arranging the magnetic generator 10 in the vicinity of the actuator as shown in FIG. 9 so that the decrease of noise and the stability against disturbance magnetic fields can be realized in perpendicular recording. In this embodiment, in particular, the magnetic generator 10 is designed in such a manner that the direction of the applied magnetic field (longitudinal direction of the disk) 91 from the magnetic generator 10 becomes approximately equal to the magnetic pinning direction 90 of the magnetic pinning layer 80.

Incidentally, in any of the disk drive associated with the first embodiment, the second embodiment, and variation example of the first embodiment, it has been confirmed that the soft magnetic layer 22 of the disk is sensitive to the disturbance magnetic field, and becomes unstable. Then, it is desirable to heighten the effect of the magnetic shield against the disturbance magnetic field by constituting the casing 7 and the upper cover (top cover) of the disk drive of ferromagnetic material.

As has been described above, according to the present invention, in a perpendicular magnetic recording method using a double-layered disk having a soft magnetic layer, the stability of the magnetic domain state of the soft magnetic layer can be realized practically and effectively by arranging the magnet generating means for applying a direct current magnetic field to the disk. Consequently, an attempt can be made to establish stability against a disturbance magnetic field so that practical application of a disk drive with a perpendicular magnetic recording method can be promoted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a disk medium which is a double-layered data recording medium having a magnetic recording layer and a soft magnetic layer;

a head conducting a read/write operation of data with respect to said magnetic recording layer of said disk medium;

an actuator mounting said head and having a voice coil motor for moving the head on said disk medium in a radial direction;

a magnetic device constituted integrally with first magnet member of said voice coil motor and a second magnet member of said voice coil motor for marking domain state of said soft magnetic layer substantially uniform, the first magnet member being designed not to act on said disk medium, and the second magnet member being designed to generate a magnetic field which has a maximum value of the intensity of the magnetic field corresponding to the longitudinal direction of said disk medium, the value being larger than the anisotropic field of said soft magnetic layer and being smaller than the coercive force of said magnetic recording layer.

2. The disk drive according to claim 1, wherein said magnetic recording layer of said disk medium is a recording layer for recording data with the perpendicular magnetic recording method, and said head has a write head for writing the data with the perpendicular magnetic recording method.

3. The disk drive according to claim 1, wherein a drive main body accommodating said disk medium, said head, said actuator, and said magnetic device is constituted of a casing made of a ferromagnetic substance.

* * * * *